April 27, 1954

H. A. PRASCHAK 2,676,382

APPARATUS FOR MAKING BLOCKS OF PLASTIC MATERIAL

Filed March 20, 1951

H. A. Praschak
INVENTOR,
BY *C. A. Snow & Co.*
ATTORNEYS.

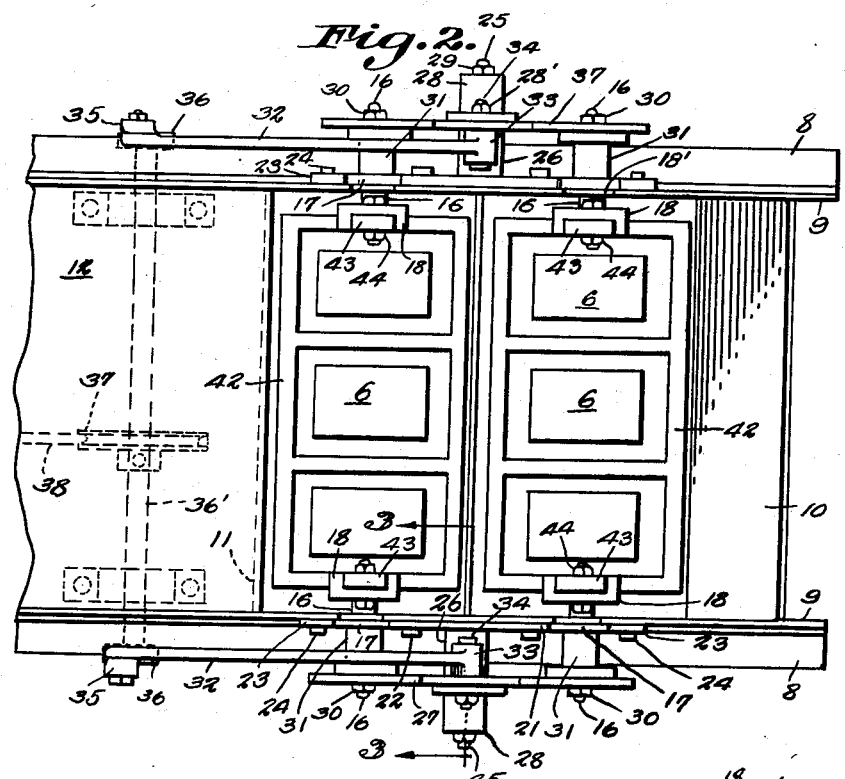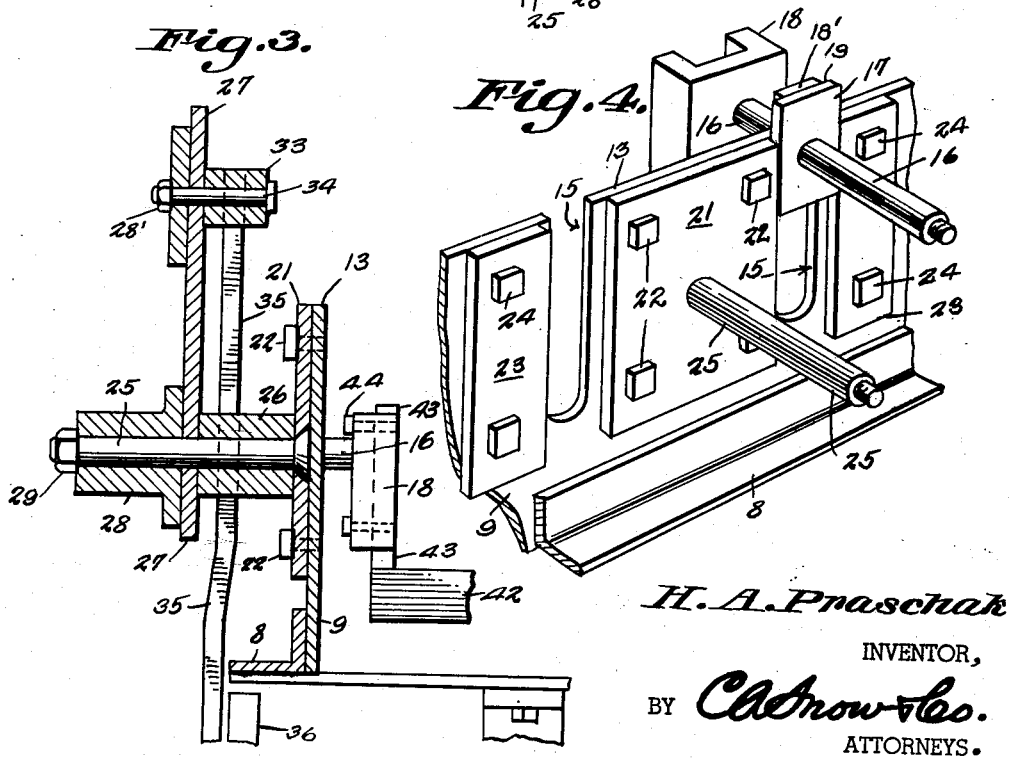

Patented Apr. 27, 1954

2,676,382

UNITED STATES PATENT OFFICE 2,676,382

APPARATUS FOR MAKING BLOCKS OF PLASTIC MATERIAL

Henry A. Praschak, Marshfield, Wis.

Application March 20, 1951, Serial No. 216,575

1 Claim. (Cl. 25—41)

This invention relates to plastic block molding machines, the primary object of the invention being to provide means used in conjunction with vibrating plastic block mold boxes for tamping the plastic as it is being deposited in the vibrating mold boxes of the machine, thereby insuring it being evenly distributed in the vibrating mold boxes due to the fact that the vertically movable tampers operate to cause the plastic material to gradually feed under the tampers, to the end that the required amount of material will be fed to insure against air pockets in the molded block.

Another important object of the invention is to provide means for feeding plastic material to vibrating mold boxes in such a way that there is little or no waste in feeding the plastic material to the mold boxes from the hopper in which the plastic material is deposited for transfer to the mold boxes.

A still further object of the invention is to provide means for tamping the plastic material in such a way that the plastic material will be packed evenly throughout the length of the block being formed.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings:

Fig. 2 is a plan view thereof.

Fig. 3 is a sectional view taken on line 3—3 of Fig. 2.

Fig. 4 is an enlarged perspective view illustrating the means for mounting the tampers.

Figure 1:
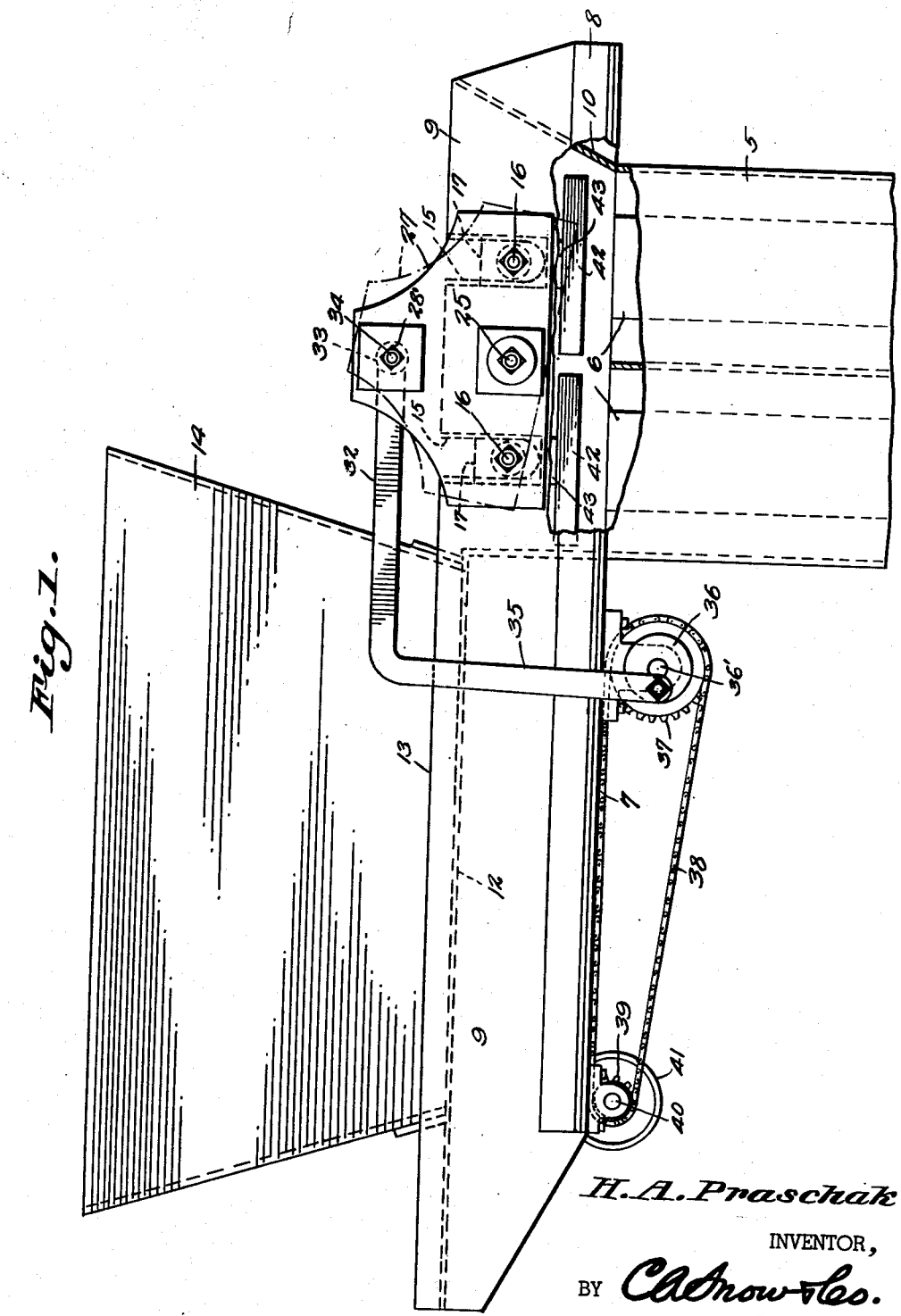
Figure 1 is a side elevational view illustrating a plastic block forming machine, constructed in accordance with the invention, a portion of the supply box and mold boxes having been broken away, illustrating the tampers within the supply box.

Referring to the drawings in detail, the reference character 5 indicates a pair of mold boxes, provided with cores 6, the mold boxes being of the usual and well known construction and of the type which are vibrated by suitable operating means, not shown.

The mold boxes 5 are supported under the material supply box track which includes side rails 7. As shown, these rails or tracks extend an appreciable distance beyond one side of the mold boxes and are disposed in a horizontal position to receive the angle bars 8 that are secured along the side members 9 thereby providing a supporting means for the material supply box, permitting the supply box to move longitudinally of the track or side rails 7.

The material supply box comprises parallel side members 9 which are connected adjacent to one of their respective ends by means of the inclined wall 10 which is so inclined that material deposited on the wall will gravitate to the bottom of the material supply box. The side members 9 are also connected by the vertical member 11 which extends upwardly from the bottom of the material supply box, terminating at a point in spaced relation with the upper edges of the side members 9, the vertical member 11 providing a wall spaced a distance from the inclined wall 10, equal to the width of the mold boxes, over which the material supply box moves.

Connected with the upper edge of the vertical member or division plate 11, is the horizontal plate 12 which moves under the hopper providing a temporary bottom for said hopper. The plate 12 also extends along the upper portion of the material supply box at a point in spaced relation with the upper edges 13 of the side members 9 of the material supply box, so that the hopper indicated by the reference character 14 and which is supported above the material supply box, may fit into the upper portion of the material supply box in such a way that the material supply box may slide under the hopper 14, but prevent the material from finding its way between the walls of the hopper 14 and side members 9 to impair the operation of the machine.

The side members 9 are formed with elongated cut-out portions 15 extending downwardly from the upper edges thereof, the cut-out portions 15 providing guide ways for the shafts 16 that extend outwardly from the blocks 17, the shafts being secured to the substantially U-shaped bearing members or supports 18. The blocks 17 are secured to the members 18' providing flanges 19 that move over the outer surfaces of the side members 9, adjacent to the elongated cut-out portions 15 so that the bearing members 18 will slide readily and may be readily moved vertically to remove them from the material supply box, if desired.

Secured to the outer surfaces of the side members 9 and arranged between adjacent cut-out portions 15, are bearing plates 21, which are of widths slightly less than the distance between the cut-out portions 15, exposing portions of the side members 9 for contact with the blocks 17. Bolts 22 are provided and secure the bearing plates 21 in place.

Secured to the side members 9 adjacent to the opposite side edges of the cut-out portions 15, are vertical plates 23 that are held in position by means of bolts 24, one of the longitudinal side edges of each plate 23 being spaced from the adjacent edge of the cut-out portion associated therewith.

Extending outwardly from the bearing plates 21 at opposite sides of the material supply box are shafts 25 on which tubular spacers 26 are mounted. These shafts 25 provide supports for the substantially triangular rocker brackets 27 which are provided with central openings through which the shafts 25 extend. The collars 28 are positioned over the outer ends of the shafts 25, and are held in place by means of nuts 29. These shafts 25 provide pivotal supports for the rocker brackets 27 which are held between the outer ends of the spacers 26 and collars 28. The shafts 16 which are carried by the blocks 17 are secured to the rocker brackets 27 by means of the nuts 30, the shafts 16 being supplied with tubular spacers 31 that hold the rocker brackets spaced from the side members 9 of the supply boxes.

These rocker brackets are pivoted by means of the pitmans 32 which have bearings 33 formed at their forward ends, the bearings being positioned on the shafts 34 that are secured to the rocker brackets 27 by means of the nuts 28'. These pitmans 32 have their downwardly extended ends 35 connected to the eccentrics 36 that are secured on the ends of the shaft 36' which is disposed within the material supply box directly under the horizontal plate 12, which protects the shaft against the plastic material passing through the hopper contacting the shaft and bearings.

Secured to the shaft 36' is the pulley 37 over which the chain 38 operates, the chain 38 also operating over the pulley 39 secured on one end of the shaft 40 of the motor 41 secured under the side rails 7. Thus it will be seen that due to this construction, as the shaft 36' is rotated, the rocker brackets will be pivoted from the position shown in full lines of Fig. 1 of the drawings, to the positions shown in dotted lines.

The reference character 42 indicates tampers which are box-like in formation and so constructed that they provide tamping surfaces that lie directly above the mold boxes in such a way that material tamped thereby, will be forced into the space between the cores and mold boxes.

These tampers have upwardly extended arms 43 that fit within the U-shaped guide members or supports 18, as clearly shown by Fig. 2 of the drawings, the arms 43 being held within the guide members or supports 18 by means of the bolts 44. Since the shafts 16 are mounted for pivotal movement, it will be obvious that the tampers will remain in vertical positions as they swing with the rocker brackets.

It might be further stated that the mold boxes with which this feed and tamping device is used, are of the well known vibrating type, but since it has been found in use that when the material of which the blocks are formed is vibrated, without tamping, the blocks are irregularly formed, the blocks being solid at the lower ends of the molds, because of the weight of the material thereabove, while the opposite ends of the molds appear to be much more loosely formed, resulting an inferior block.

After the molding and tamping operation, the material supply box is slid rearwardly, which causes the upper edges of the blocks to be smoothly formed by contact with the lower edge of the material supply box.

In operation the material supply box is moved to a position to the left of the position as shown by Fig. 1 of the drawings, whereupon a measured quantity of plastic material will fall by gravity from the hopper into the material supply box. It follows that when the material supply box has been filled the material supply box is slid to the right or to the position directly over the vibrating mold as shown by Fig. 1. The tampers are now set in motion in a manner as previously described, which tampers operate to evenly spread and pack the plastic material within the molds around the cores 6.

The blocks are removed from the molds in the usual and well known manner and the operation of the machine may be continued.

Having thus described the invention, what is claimed is:

A machine for making concrete blocks comprising in combination, molds having open upper ends, a hopper supported laterally of the molds and spaced above said molds, and elongated material supply box having its top and bottom open, into which material from the hopper is delivered, rocker brackets mounted exteriorly of the supply box, tamping members supported wholly within the supply box adapted to agitate material fed to the supply box from said hopper, pitmans connected with said brackets, and eccentrics mounted under the supply box to which the pitmans are connected, operating the tamping members as the eccentrics are rotated, tamping material in said molds.

References Cited in the file of this patent

UNITED STATES PATENTS

| Number | Name | Date |
|---|---|---|
| 988,367 | McHench | Apr. 4, 1911 |
| 1,498,373 | Harvey | June 17, 1924 |
| 2,270,829 | Wellnitz | Jan. 20, 1942 |
| 2,297,504 | Salvaneschi | Sept. 29, 1942 |

FOREIGN PATENTS

| Number | Country | Date |
|---|---|---|
| 542,394 | Great Britain | Jan. 23, 1932 |